(12) United States Patent
Aurilio et al.

(10) Patent No.: US 12,474,387 B2
(45) Date of Patent: Nov. 18, 2025

(54) METHOD, ELECTRONIC DEVICE AND SYSTEM FOR ITERATIVELY MEASURING THE INSULATION RESISTANCE OF AN ENERGIZED ELECTRICAL APPARATUS WITH RESPECT TO GROUND

(71) Applicant: MARELLI EUROPE S.P.A., Corbetta (IT)

(72) Inventors: Gianluca Aurilio, Corbetta (IT); Simone Patrinostro, Corbetta (IT); Rosanna Suglia, Corbetta (IT); Brahim El Goumri, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 167 days.

(21) Appl. No.: 18/542,906

(22) Filed: Dec. 18, 2023

(65) Prior Publication Data

US 2024/0201238 A1    Jun. 20, 2024

(30) Foreign Application Priority Data

Dec. 20, 2022    (IT) .................. 102022000026010

(51) Int. Cl.
    *G01R 27/02*      (2006.01)
    *G01R 31/36*      (2020.01)
    *G01R 31/385*     (2019.01)

(52) U.S. Cl.
    CPC ....... *G01R 27/025* (2013.01); *G01R 31/3648* (2013.01); *G01R 31/385* (2019.01)

(58) Field of Classification Search
    CPC .................. G01R 27/2617; G01R 31/1272
    See application file for complete search history.

(56) References Cited

U.S. PATENT DOCUMENTS

| | | | |
|---|---|---|---|
| 2017/0176512 A1* | 6/2017 | Pritelli | ............ G01R 19/16566 |
| 2021/0041505 A1 | 2/2021 | Fan et al. | |

(Continued)

FOREIGN PATENT DOCUMENTS

| | | |
|---|---|---|
| DE | 102018116055 B3 | 10/2019 |
| DE | 102021106968 B3 | 9/2022 |

(Continued)

OTHER PUBLICATIONS

Search Report for Italian Patent Application No. 202200026010 dated Jun. 13, 2023.

*Primary Examiner* — Tung X Nguyen
(74) *Attorney, Agent, or Firm* — Howard & Howard Attorneys PLLC

(57) ABSTRACT

A method for measuring a negative terminal insulation resistance $R_{in}$, present between a negative terminal of an energized electrical apparatus and a ground ideally isolated from the energized electrical apparatus, and a positive terminal insulation resistance $R_{ip}$, present between a positive terminal of the energized electrical apparatus and the aforesaid ground ideally isolated from the energized electrical apparatus. A first switching circuit is arranged between the positive terminal and ground, thus in parallel with the positive terminal insulation resistance $R_{ip}$, and arranging a second switching circuit between said negative terminal and ground, thus in parallel with the negative terminal insulation resistance ($R_{in}$).

19 Claims, 5 Drawing Sheets

(56) References Cited

U.S. PATENT DOCUMENTS

2021/0096167 A1\* 4/2021 Erk ...................... B60L 3/0069
2023/0127297 A1 4/2023 Eitler et al.

FOREIGN PATENT DOCUMENTS

DE 102021127385 B3 11/2022
EP 3182146 A1 6/2017

\* cited by examiner

METHOD, ELECTRONIC DEVICE AND SYSTEM FOR ITERATIVELY MEASURING THE INSULATION RESISTANCE OF AN ENERGIZED ELECTRICAL APPARATUS WITH RESPECT TO GROUND

CROSS-REFERENCE TO RELATED APPLICATIONS

The present application claims priority to and all the benefits of Italian Patent Application No. 102022000026010, filed on Dec. 20, 2022, the entire contents of which are expressly incorporated herein by reference.

BACKGROUND OF THE INVENTION

1. Field of the Invention

The present invention relates to a method, an electronic device, and a system for iteratively measuring the insulation resistance of an energized electrical apparatus with respect to ground, and thus also for a diagnosis of insulation loss of such an apparatus.

Note that, although the present description shows in particular the application of the invention to a battery for electric or hybrid motor, by way of example, it will be apparent that the invention is equally applicable to any energized electrical apparatus or system with respect to ground or to a general reference or protection ground.

2. Description of the Related Art

The constantly increasing use of electrochemical batteries with high nominal voltages, for example in electric and hybrid vehicles, entails the possibility of electrical risk linked to the use of such voltages, which are potentially dangerous for people and things. Therefore, the danger connected to the use of electricity, until now considered mainly related to the use of electricity in the workplace or at home, is now also manifested in electric or hybrid cars equipped with storage systems characterized by potentially dangerous electrical voltages.

The further spread of electric traction on vehicles, expected in the coming years, connected to the frequent and widespread use thereof for the transport of people and things, could mean that the electrical risk and potential danger associated with the use of lithium batteries for traction, becomes one of the main causes of risk for the safety of people who use such means of transport in the future.

Any drawbacks (such as, for example, malfunctions due to obsolescence of the components of the electrical apparatus, dielectric breakdown or electrical discharges) pose the problem of protection from potentially dangerous events, such as the occurrence of short-circuits or insulation losses, which can cause fires and/or explosions, even particularly serious if in the presence of flammable or explosive substances, and such as to even endanger people's lives.

Among such possible drawbacks, the loss of insulation of the battery voltage with respect to ground or to a general reference or protective ground (such as the car chassis) is one of the faults which can most frequently occur.

To give an example, in the event of a failure due to a cable with a damaged coating in contact with the vehicle body, there is a drastic decrease in the insulation resistance between the high-voltage circuit and the vehicle body. Such a decrease in insulation resistance can be diagnosed using an electronic circuit, also of known type, capable of detecting the insulation resistance.

In fact, in electric and hybrid vehicles equipped with high-voltage systems, it is known to use an insulation resistance detection circuit, appropriately inserted in the electrical system, and capable of measuring the insulation resistance between the high-voltage circuit and the vehicle chassis in a run-time mode.

Among the various safety and protection requirements, inter alia, there is the possibility to use an insulation resistance monitoring system installed on the vehicle to check the integrity of the high-voltage circuit of the battery using a periodic measurement, preferably carried out automatically, of the insulation resistance value of the battery with respect to ground or to a general reference or protection ground.

However, the aforesaid known solutions have some drawbacks, among which the main one consists of the long times (for example, 30 s) which are needed for measuring the insulation resistance, and which are inadequate to the needs.

Another need which has not yet been fully met relates to the improvement of the accuracy of the insulation resistance measurements carried out in a run-time mode.

In light of the above, mainly in the field of automotive applications but also in other application areas (it is easily understood that similar needs can arise for energized apparatuses other than a battery and used in other contexts), the need is strongly felt to devise a method for measuring insulation resistance (and a related electronic device and electronic system) capable of measuring insulation resistance more quickly and at the same time more accurately with respect to the currently available solutions, and such as to better meet the aforesaid needs.

SUMMARY OF THE INVENTION

It is the object of the present invention to provide a method for measuring insulation resistance such as to allow at least partially obviating the drawbacks indicated above with reference to the prior art, and to meet the aforementioned needs particularly felt in the technical field considered.

Such an object is achieved by an insulation resistance measuring method for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and the ground ideally isolated from the energized electrical apparatus. The method comprises the steps of: arranging a first switching circuit between the positive terminal and ground, thus in parallel with the positive terminal insulation resistance ($R_{ip}$). The first switching circuit comprises a first switching unit, configured to take either one of two states according to a first driving signal having a positive branch switching duty-cycle ($d_p$), and a first sample resistance ($R_{kp}$) arranged in series with respect to the first switching unit. The method further includes the steps of arranging a second switching circuit between the negative terminal and ground, thus in parallel with the negative terminal insulation resistance ($R_{in}$). The second switching circuit comprises a second switching unit configured to take either one of two states according to a second driving signal having a negative branch switching duty-cycle ($d_n$) and a second sample resistance ($R_{kn}$) arranged in series with respect to said second switching unit. The method also includes the steps of defining at least two working points of the circuit consisting of the energized electrical apparatus, the first switching circuit, and the second switching circuit, wherein the first working point is associated with a first positive branch switching duty-cycle value ($d_{p1}$) and a first negative branch switching duty-cycle value ($d_{n1}$), and the second working point is associated with a second positive branch switching duty-cycle value ($d_{p2}$) and a second negative branch switching duty-cycle value ($d_{n2}$). The method further includes the steps of controlling the first switching circuit and the second switching circuit so that they operate in accordance with the first working point, and measuring, in such a condition, a respective first battery voltage value ($V_{B1}$) present between the negative terminal and positive terminal and a respective first reference voltage value ($V_{iso1}$) representative of a voltage present at the ends of one of the first switching circuit and the second switching circuit, determined by the first working point and also dependent on both the negative terminal insulation resistance ($R_{in}$) and the positive terminal insulation resistance ($R_{ip}$). The method then controls the first switching circuit and the second switching circuit so that they operate in accordance with the second working point, and measures, in such a condition, a respective second battery voltage value ($V_{B2}$) present between the negative terminal and positive terminal and a respective second reference voltage value ($V_{iso2}$) representative of a voltage present at the ends of one of the first switching circuit and the second switching circuit, determined by the second working point and also dependent on both the negative terminal insulation resistance ($R_{in}$) and the positive terminal insulation resistance ($R_{ip}$). The method then calculates the negative terminal insulation resistance ($R_{in}$) and the positive terminal insulation resistance ($R_{ip}$), based on the first battery voltage value ($V_{B1}$), first reference voltage value ($V_{iso1}$), second battery voltage value ($V_{B2}$), and second reference voltage value ($V_{iso2}$). The step of defining at least two working points comprises determining the first positive branch switching duty-cycle value ($d_{p1}$), first negative branch switching duty-cycle value ($d_{n1}$), second positive branch switching duty-cycle value ($d_{p2}$), and second negative branch switching duty-cycle value ($d_{n2}$) based on the criterion of keeping the first reference voltage value ($V_{iso1}$) and the second reference voltage value ($V_{iso2}$) within a given neighborhood with respect to a predefined reference target voltage ($V_t$).

It is a further object of the present invention to provide a method for diagnosing an insulation loss of an energized electrical apparatus, based on the aforesaid insulation resistance measuring method.

It is also an object of the present invention to provide an electronic device for measuring an insulation resistance. Such an object is achieved by an electronic device for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and the ground ideally isolated from the energized electrical apparatus. The electronic device includes a first device terminal and a second device terminal being connectable to the negative and positive terminals of the energized electrical apparatus, respectively; a first switching circuit arranged between the positive terminal and ground, thus in parallel with the positive terminal insulation resistance ($R_{ip}$), wherein the first switching circuit comprises a first switching unit, configured to take either one of two states according to a driving signal having a positive branch switching duty-cycle ($d_p$), and a first sample resistance ($R_{kp}$) arranged in series with respect to the first switching unit. A second switching circuit arranged between the negative terminal and ground, thus in parallel with the negative terminal insulation resistance ($R_{in}$). The second switching circuit comprises a second switching unit configured to take either one of two states according to a driving signal having a negative branch switching duty-cycle ($d_n$) and a second sample resistance ($R_{kn}$) arranged in series with respect to said second switching unit. An electronic control processor is configured to: define at least two working points of the circuit consisting of the energized electrical apparatus, the first switching circuit, and the second switching circuit, wherein the first working point is associated with a first positive branch switching duty-cycle value ($d_{p1}$) and a first negative branch switching duty-cycle value ($d_{n1}$), and the second working point is associated with a second positive branch switching duty-cycle value ($d_{p2}$) and a second negative branch switching duty-cycle value ($d_{n2}$); control the first switching circuit and the second switching circuit so that they operate in accordance with said first working point, and measure, in such a condition, a respective first battery voltage value ($V_{B1}$) present between the negative terminal and positive terminal and a respective first reference voltage value ($V_{iso1}$) representative of a voltage present at the ends of one of the first switching circuit and the second switching circuit, determined by the first working point and also dependent on both the negative terminal insulation resistance ($R_{in}$) and the positive terminal insulation resistance ($R_{ip}$). The electronic device controls the first switching circuit and the second switching circuit so that they operate in accordance with said second working point, and measure, in such a condition, a respective second battery voltage value ($V_{B2}$) present between said negative terminal and positive terminal and a respective second reference voltage value ($V_{iso2}$) representative of a voltage present at the ends of one of the first switching circuit and the second switching circuit, determined by the second working point and also dependent on both the negative terminal insulation resistance ($R_{in}$) and the positive terminal insulation resistance ($R_{ip}$). The electronic device calculates the negative terminal insulation resistance ($R_{in}$) and the positive terminal insulation resistance ($R_{ip}$), based on the first battery voltage value ($V_{B1}$), first reference voltage value ($V_{iso1}$), second battery voltage value ($V_{B2}$), and second reference voltage value ($V_{iso2}$). The electronic control processor is configured to determine the first positive branch switching duty-cycle value ($d_{p1}$), first negative branch switching duty-cycle value ($d_{n1}$), second positive branch switching duty-cycle value ($d_{p2}$), and second negative branch switching duty-cycle value ($d_{n2}$) based on the criterion of keeping the first reference voltage value ($V_{iso1}$) and the second reference voltage value ($V_{iso2}$) within a given neighborhood with respect to a predefined reference target voltage ($V_t$).

It is another object of the present invention to provide an electronic system for measuring an insulation resistance. Such an object is achieved by an electronic system for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and the ground ideally isolated from the energized electrical apparatus.

BRIEF DESCRIPTION OF THE DRAWINGS

Further features and advantages of the method, electronic device and electronic system according to the invention will be apparent from the following description of preferred embodiments, given by way of indicative, non-limiting examples, with reference to the accompanying figures, in which:

FIG. 1 shows a battery, the insulation resistance of which is to be measured, and the circuits of an electronic device according to an embodiment of the present invention;

FIG. 1B shows an electronic system of the present invention that measures a negative terminal insulation resistance $R_{in}$;

DETAILED DESCRIPTION OF THE INVENTION

Figure 1:
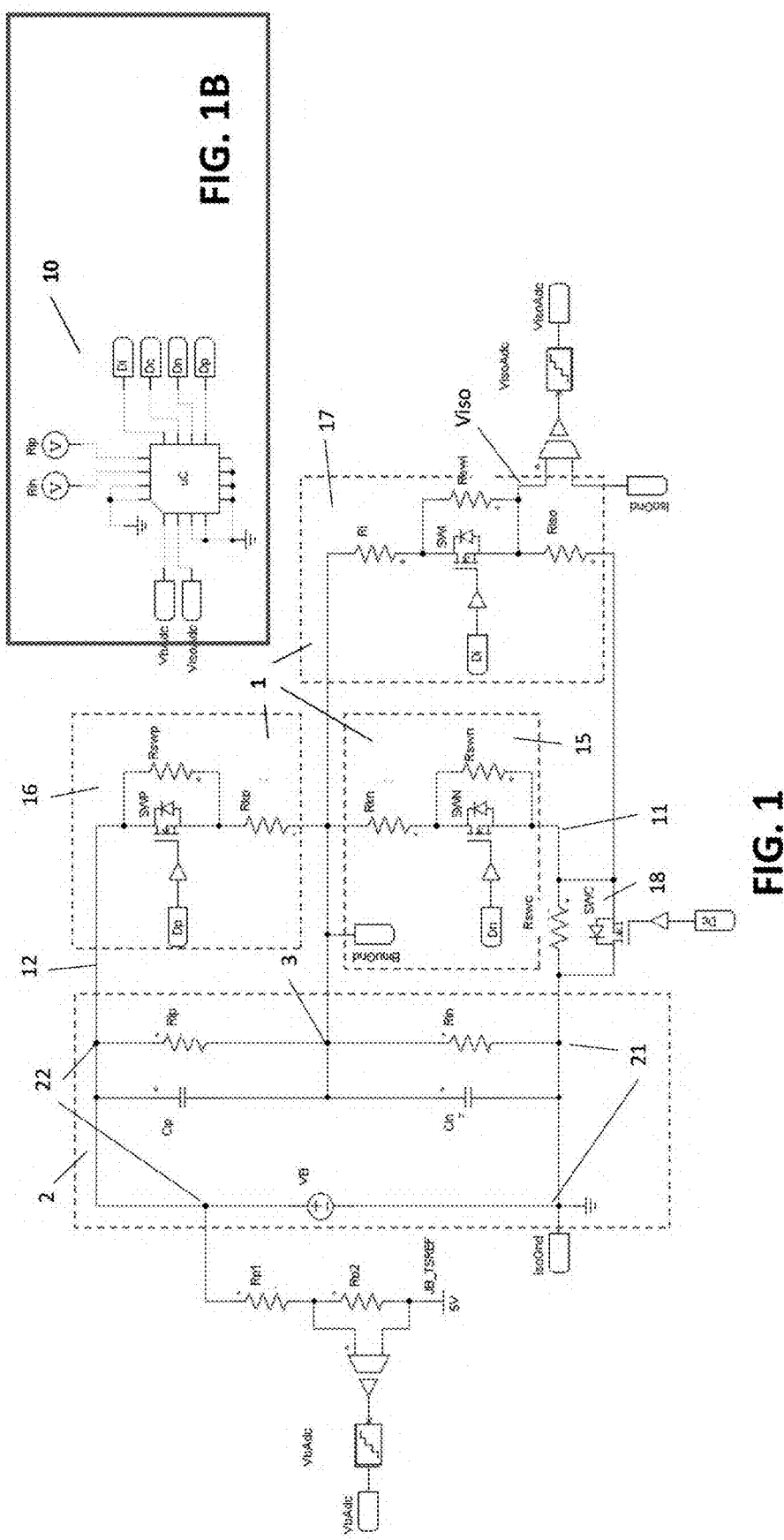
FIG. 1 shows a schematic diagram of a circuit to which the method of the present invention is applied; in particular.

With reference to FIGS. 1-5, a method is described for measuring a negative terminal insulation resistance $R_{in}$, present between a negative terminal 11 of an energized electrical apparatus 2 and a ground 3 ideally isolated from the energized electrical apparatus 2, and a positive terminal insulation resistance $R_{ip}$, present between a positive terminal 12 of the energized electrical apparatus 2 and the aforesaid ground 3 ideally isolated from the energized electrical apparatus 2.

Such a method first provides arranging a first switching circuit 16 between said positive terminal 12 and ground 3, thus in parallel with the positive terminal insulation resistance $R_{ip}$, and arranging a second switching circuit 15 between said negative terminal 11 and ground 3, thus in parallel with the negative terminal insulation resistance $R_{in}$.

The aforesaid first switching circuit 16 comprises a first switching unit, configured to take either one of two states according to a first driving signal having a positive branch switching duty-cycle $d_p$, and a first sample resistance $R_{ip}$ arranged in series with respect to the aforesaid first switching unit.

The aforesaid second switching circuit 15 comprises a second switching unit configured to take either one of two states according to a second driving signal having a negative branch switching duty-cycle $d_n$ and a second sample resistance $R_{in}$ arranged in series with respect to said second switching unit.

The first switching circuit 16 will hereinafter also be referred to as a "positive branch" or "positive switching branch". The second switching circuit 16 will hereinafter also be referred to as a "negative branch" or "negative switching branch". The set of the first and second switching circuits will hereinafter be referred to as the "insulation loss (LOI) measurement circuit".

The method then comprises the step of defining at least two working points of the circuit consisting of the energized electrical apparatus 2, the first switching circuit 16, and the second switching circuit 15; a first working point is associated with a first positive branch switching duty-cycle value $d_{p1}$ and a first negative branch switching duty-cycle value $d_{n1}$; the second working point is associated with a second positive branch switching duty-cycle value $d_{p2}$ and a second negative branch switching duty-cycle value $d_{n2}$.

The method further includes controlling the first switching circuit 16 and the second switching circuit 15 so that they operate in accordance with the aforesaid first working point, and measuring, in such a condition, a respective first battery voltage value $V_{B1}$, present between the negative terminal 11 and the positive terminal 12, and a respective first reference voltage value $V_{iso1}$, representative of a voltage present at the ends of one of the first switching circuit 16 and the second switching circuit 15; such a reference voltage is thus determined by the first working point and is also dependent on both the negative terminal insulation resistance $R_{in}$ and the positive terminal insulation resistance $R_{ip}$.

The method then includes controlling the first switching circuit 16 and the second switching circuit 15 so that they operate in accordance with the second working point, and measuring, in such a condition, a respective second battery voltage value $V_{B2}$, present between said negative terminal 11 and positive terminal 12, and a respective second reference voltage value $V_{iso2}$, representative of a voltage present at the ends of one of the first switching circuit 16 and the second switching circuit 15; such a reference voltage is thus determined by the second working point and is also dependent on both the negative terminal insulation resistance $R_{in}$ and the positive terminal insulation resistance $R_{ip}$.

Finally, the method provides calculating the aforesaid negative terminal insulation resistance $R_{in}$ and positive terminal insulation resistance $R_{ip}$, based on the aforesaid first battery voltage value $V_{B1}$, first reference voltage value $V_{iso1}$, second battery voltage value $V_{B2}$ and second reference voltage value $V_{iso2}$.

The aforesaid step of defining at least two working points comprises determining the aforesaid first positive branch switching duty-cycle value $d_{p1}$, first negative branch switching duty-cycle value $d_{n1}$, second positive branch switching duty-cycle value $d_{p2}$, and second negative branch switching duty-cycle value $d_{n2}$ based on the criterion of keeping the first reference voltage value $V_{iso1}$ and the second reference voltage value $V_{iso2}$ within a given neighborhood with respect to a predefined reference target voltage $V_t$.

According to an embodiment of the method, the aforesaid steps of defining at least two working points, controlling the first switching circuit 16 and the second switching circuit 15 so that they operate in accordance with the first working point, measuring a respective first battery voltage value $V_{B1}$ and a respective first reference voltage value $V_{iso1}$, controlling the first switching circuit 16 and the second switching circuit 15 so that they operate in accordance with the second working point and measuring a respective second battery voltage value $V_{B2}$ and a respective second reference voltage value $V_{iso2}$ are carried out continuously and iteratively, so that the negative terminal insulation resistance $R_{in}$ and the positive terminal insulation resistance $R_{ip}$ are in turn, continuously and dynamically calculated; the negative terminal insulation resistance $R_{in}$ and the positive terminal insulation resistance $R_{ip}$ are considered valid if and/or since the first reference voltage value $V_{iso1}$ and the second reference voltage value $V_{iso2}$ differ from the predefined reference target voltage $V_t$ by an error e less than a predefined maximum error E.

In accordance with an embodiment of the method, the aforesaid first switching unit comprises a first switch SWP, configured to take an open state or a closed state according to the first driving signal with positive branch switching duty-cycle $d_p$, in which the closed state has a substantially zero resistance and the open state has a resistance such as to be modeled as a first switching resistance $R_{SWP}$ arranged in parallel with respect to the first switch SWP.

Similarly, the aforesaid second switching unit comprises a second switch SWN, configured to take an open state or a closed state according to the second driving signal with negative branch switching duty-cycle $d_n$, in which the closed state has a substantially zero resistance and the open state has a resistance such as to be modeled as a second switching resistance $R_{SWN}$ arranged in parallel with respect to the second switch (SWN).

According to an implementation option of the method, the negative terminal insulation resistance $R_{in}$ is calculated as the inverse of a negative terminal insulation conductance $G_{in}$ and the positive terminal insulation resistance $R_{ip}$ is calculated as the inverse of a positive terminal insulation conductance $G_{ip}$.

In such a case, the negative terminal insulation conductance $G_{in}$ and the positive terminal insulation conductance $G_{ip}$ are calculated by solving a system of equations containing parameters referred to measurable quantities or predefinable circuit parameters.

The details of the equations to be solved, obviously, depend on the exact configuration of the circuit used.

In accordance with a particular implementation example (which will be further detailed below), the negative terminal insulation conductance $G_{in}$ and the positive terminal insulation conductance $G_{ip}$ are calculated by solving the following system of equations:

$$\begin{cases} V_{iso1} = \dfrac{V_{B1}P(G_{p1} + G_{ip})}{G_{p1} + G_{ip} + G_{n1} + G_{in}} \\ V_{iso2} = \dfrac{V_{B2}P(G_{p2} + G_{ip})}{G_{p2} + G_{ip} + G_{n2} + G_{in}} \end{cases}$$

which leads to the following solution:

$$\begin{cases} G_{ip} = \dfrac{V_{iso1}V_{iso2}(G_{n1} + G_{p1} - G_{n2} - G_{p2}) + P(V_{B2}V_{iso1}G_{p2} - V_{B1}V_{iso2}G_{p1})}{P(V_{B1}V_{iso2} - V_{B2}V_{iso1})} \\ G_{in} = \dfrac{V_{B1}P(G_{p1} + G_{ip})}{V_{iso1}} - (G_{ip} + G_{n1} + G_{p1}) \end{cases}$$

in which $V_{iso1}$ and $V_{iso2}$ are the reference voltage values measured at the first and second working points, respectively; $V_{B1}$ and $V_{B2}$ are the battery voltage values measured at the first and second working points, respectively; $G_{p1}$ and $G_{p2}$ are the inverse values of an equivalent positive branch resistance $R_{ps}$ calculated at the first and second working points, respectively; $G_{n1}$ and $G_{n2}$ are the inverse values of an equivalent negative branch resistance $R_{ns}$ calculated at the first and second working points, respectively; P is a parameter dependent on a reference voltage measurement circuit.

The insulation resistance values of the positive branch and the negative branch are easily obtained from the values of $G_{in}$ and $G_{ip}$, as:

$R_{in}=1/G_{in}$ and $R_{ip}=1/G_{ip}$.

According to an embodiment of the method, the aforesaid steps of measuring a first reference voltage value $V_{iso1}$ and a second reference voltage value $V_{iso2}$ are carried out by a measurement circuit 17 placed in parallel with the first switching circuit 16 or the second switching circuit 15.

According to an implementation option, the aforesaid measurement circuit 17 comprises a first measurement resistance $R_i$ and a second measurement resistance $R_{iso}$ arranged mutually in series to form a voltage divider; the aforesaid first reference voltage value $V_{iso1}$ and second reference voltage value $V_{iso2}$ correspond to the voltage present at the connection between the first measurement resistance $R_i$ and the second measurement resistance $R_{iso}$, measured at the first and second working points, respectively.

In accordance with an implementation option, the aforesaid measurement circuit 17 is arranged in parallel with the second switching circuit 16, i.e., with the negative switching branch.

In such a case, the aforesaid equivalent positive branch resistance $R_{ps}$, and the values taken by the equivalent positive branch resistance $R_{ps}$ for duty-cycle values equal to 1 and 0, are calculated by the following equation:

$$R_{ps} = \frac{R_{kp}(R_{kp} + R_{swp})}{R_{kp} + d_p R_{swp}} \rightarrow \begin{cases} R_{ps} = R_{kp}(d_p = 1) \\ R_{ps} = R_{kp} + R_{swp}(d_p = 0) \end{cases}$$

Similarly, the aforesaid equivalent negative branch resistance $R_{ns}$, and the values taken by the equivalent negative branch resistance $R_{ns}$ for duty-cycle values equal to 1 and 0, are calculated by the following equation:

$$R_{ns} = \frac{R_{kn}(R_{kn} + R_{swn})}{R_{kn} + d_n R_{swn}} \rightarrow \begin{cases} R_{ns} = R_{kn}(\text{per } d_n = 1) \\ R_{ns} = R_{kn} + R_{swn}(\text{per } d_n = 0) \end{cases}$$

In such a case, the aforesaid parameter P is representative of the voltage divider, and is calculated as:

$$P = \frac{R_{iso}}{R_i + R_{iso}}$$

According to an implementation option of the method, the aforesaid measurement circuit 17 further comprises a measurement activation switch SWI, arranged between the aforesaid first measurement resistance $R_i$ and second measurement resistance $R_{iso}$, and configured to activate or deactivate the measurement operation based on a respective control signal Di.

According to an embodiment, the aforesaid method steps, which are carried out continuously and iteratively, comprise the following steps.

Firstly, a first initial working point is defined, in which one of the aforesaid positive branch switching duty-cycle $d_p$ and negative branch switching duty-cycle $d_n$ is set to a value of 1, corresponding to the closure of the respective switch, and the other of the aforesaid positive branch switching duty-cycle $d_p$ and negative branch switching duty-cycle $d_n$ is set to a value of 0, corresponding to the opening of the respective switch; the measured initial reference voltage value $V_{iso}$ is taken as the first reference voltage value Vu, $V_{iso1}$.

Then, the second working point is defined through the following steps:
- if the first positive branch switching duty-cycle value $d_{p1}$ is higher than the first negative branch switching duty-cycle value $d_{n1}$, defining as the second reference target voltage value $V_t$ a value $(V_{iso1}-\Delta V_{iso})$ equal to the reference voltage measured at the previous working point $V_{iso1}$ from which a predefined reference voltage variation value $\Delta V_{iso}$ is subtracted;
- if the first positive branch switching duty-cycle value $d_{p1}$ is lower than the first negative branch switching duty-cycle value $d_{n1}$, defining as the second reference target voltage value $V_{t2}$ a value $(V_{t1}+\Delta V_{iso})$ equal to the reference voltage measured at the previous working point $V_{iso1}$ to which a predefined reference voltage variation value $\Delta V_{iso}$ is added;
- determining the second positive branch switching duty-cycle value $d_{p2}$ and the second negative branch switching duty-cycle value $d_{n2}$, by varying the respective initial values, according to the criterion of causing the reference voltage $V_t$ to tend towards the aforesaid second reference target voltage value $V_{t2}$.

According to an implementation option of the method, the aforesaid steps of defining the first and second working points are carried out iteratively, according to a sequence of calculation sessions in which the previous second working point becomes the first working point, and a new second working point is defined in accordance with the step of defining a second working point shown above.

Thereby, at each calculation session (each carried out on two dynamically variable working points as described above), a dynamically updated negative terminal insulation resistance value $R_{in}$ and a dynamically updated positive terminal insulation resistance value $R_{ip}$ are determined.

In accordance with an embodiment of the method, the first positive branch driving signal is a modulated signal of the Pulse Width Modulation (PWM) type with the aforesaid first positive branch switching duty-cycle ($d_{p1}$, $d_{p2}$); the second negative branch driving signal is a modulated signal of the Pulse Width Modulation (PWM) type with the aforesaid second negative branch switching duty-cycle ($d_{n1}$, $d_{n2}$).

According to an embodiment, the method is applied to a case in which the aforesaid energized electrical apparatus 2 is an electrical battery for vehicles (e.g., a high-traction electrical battery) and the aforesaid ground 3 ideally isolated from the energized electrical apparatus is a ground of the vehicle chassis or an isolated ground of an electrical control unit, ECU, of the vehicle (which can comprise another low voltage battery, typically 12 V).

A method for diagnosing an insulation loss of an energized electrical apparatus 2 is described below, comprising:
- measuring a negative terminal insulation resistance $R_{in}$, present between a negative terminal 11 of the energized electrical apparatus and a ground ideally isolated from the energized electrical apparatus, and a positive terminal insulation resistance $R_{ip}$, present between a positive terminal of the energized electrical apparatus and the aforesaid ground ideally isolated from the energized electrical apparatus; then, diagnosing the insulation loss of the energized electrical apparatus 2 based on the measured negative terminal insulation resistance $R_{in}$ and the positive terminal insulation resistance $R_{ip}$.

The aforesaid steps of measuring a negative terminal insulation resistance $R_{in}$ and a positive terminal insulation resistance $R_{ip}$ are performed by a method for measuring insulation resistances in accordance with any of the above-described embodiments.

Again with reference to FIGS. 1-5, an electronic device 1 is now described for measuring a negative terminal insulation resistance $R_{in}$, present between a negative terminal 21 of an energized electrical apparatus 2 and a ground 3 ideally insulated from the energized electrical apparatus 2, and a positive terminal insulation resistance $R_{ip}$, present between a positive terminal 22 of the energized electrical apparatus 2 and the aforesaid ground 3 ideally isolated from the energized electrical apparatus 2.

Such an electronic device comprises a first device terminal 11 and a second device terminal 12, respectively connectable to the negative 21 and positive 22 terminals of the energized electrical apparatus 2, and further comprises a first switching circuit 16 and a second switching circuit 15 and an electronic control processor.

The first switching circuit 16 is arranged between said positive terminal 12 and ground 3, thus in parallel with the aforesaid positive terminal insulation resistance $R_{ip}$.

Such a first switching circuit 16 comprises a first switching unit, configured to take either one of two states according to a driving signal having a positive branch switching duty-cycle $d_p$, and a first sample resistance $R_{kp}$ arranged in series with respect to the aforesaid first switching unit.

The second switching circuit 15 is arranged between the aforesaid negative terminal 11 and ground 3, thus in parallel with the aforesaid negative terminal insulation resistance $R_{in}$.

Such a second switching circuit 15 comprises a second switching unit configured to take either one of two states according to a driving signal having a negative branch switching duty-cycle $d_n$ and a second sample resistance $R_{in}$ arranged in series with respect to the aforesaid second switching unit.

The electronic control processor is configured to carry out the following actions:
- defining at least two working points of the circuit consisting of the energized electrical apparatus 2, the first switching circuit 16, and the second switching circuit 15; the first working point is associated with a first positive branch switching duty-cycle value $d_{p1}$ and a first negative branch switching duty-cycle value $d_{n1}$; the second working point is associated with a second positive branch switching duty-cycle value $d_{p2}$ and a second negative branch switching duty-cycle value $d_{n2}$;
- controlling the first switching circuit 16 and the second switching circuit 15 so that they operate in accordance with the first working point, and measure, in such a condition, a respective first battery voltage value $V_{B1}$, present between the negative terminal 11 and positive terminal 12, and a respective first reference voltage value $V_{iso1}$, representative of a voltage present at the ends of one of the first switching circuit 16 and the second switching circuit 15, determined by the first working point and also dependent on both the negative terminal insulation resistance $R_{in}$ and the positive terminal insulation resistance $R_{ip}$;
- controlling the first switching circuit 16 and the second switching circuit 15 so that they operate in accordance with the second working point, and measure, in such a condition, a respective second battery voltage value $V_{B2}$, present between the negative terminal 11 and positive terminal 12, and a respective second reference voltage value $V_{iso2}$ representative of a voltage present at the ends of one of the first switching circuit 16 and the second switching circuit 15, determined by the second working point and also dependent on both the negative terminal insulation resistance $R_{in}$ and the positive terminal insulation resistance $R_{ip}$;

calculating the aforesaid negative terminal insulation resistance $R_{in}$ and positive terminal insulation resistance $R_{ip}$, based on the aforesaid first battery voltage value $V_{B1}$, first reference voltage value $V_{iso1}$, second battery voltage value $V_{B2}$ and second reference voltage value $V_{iso2}$.

The electronic control processor is further configured to determine the aforesaid first positive branch switching duty-cycle value $d_{p1}$, first negative branch switching duty-cycle value $d_{n1}$, second positive branch switching duty-cycle value $d_{p2}$, and second negative branch switching duty-cycle value $d_{n2}$ based on the criterion of keeping the first reference voltage value $V_{iso1}$ and the second reference voltage value $V_{iso2}$ within a given neighborhood with respect to a pre-defined reference target voltage $V_t$.

According to an embodiment of the device, the aforesaid first switching unit comprises a first switch SWP, configured to take an open state or a closed state according to the first driving signal with positive branch switching duty-cycle $d_p$, in which the closed state has a substantially zero resistance and the open state has a resistance such as to be modeled as a first switching resistance $R_{SWP}$ arranged in parallel with respect to the first switch SWP; similarly, the aforesaid second switching unit comprises a second switch SWN, configured to take an open state or a closed state according to said second driving signal with negative branch switching duty-cycle $d_n$, in which the closed state has a substantially zero resistance and the open state has a resistance such as to be modeled as a second switching resistance $R_{SWN}$ arranged in parallel with respect to the second switch SWN.

According to an embodiment, the device further comprises a measurement circuit 17 placed in parallel with the first switching circuit 16 or the second switching circuit 15, and configured to perform the aforesaid actions of measuring a first reference voltage value $V_{iso}$ and a second reference voltage value $V_{iso2}$.

Such a measurement circuit 17 comprises a first measurement resistance $R_i$ and a second measurement resistance $R_{iso}$ arranged mutually in series to form a voltage divider.

In such a case, the aforesaid first reference voltage value $V_{iso1}$ and second reference voltage value $V_{iso2}$ correspond to the voltage present at the connection between the first measurement resistance $R_i$ and the second measurement resistance $R_{iso}$, measured at the first and second working points, respectively.

According to an implementation option of the electronic device 1, the aforesaid measurement circuit 17 further comprises a measurement activation switch SWI, arranged between the aforesaid first measurement resistance $R_i$ and second measurement resistance $R_{iso}$, and configured to activate or deactivate the measurement operation based on a respective control signal Di.

In accordance with several possible embodiments, the electronic device 1 is configured to perform an insulation resistance measuring method according to any one of the embodiments previously shown.

Again with reference to FIGS. 1-5, an electronic system 10 for measuring a negative terminal insulation resistance $R_{in}$, present between a negative terminal 21 of an energized electrical apparatus 2 and a ground 3 ideally isolated from the energized electrical apparatus 2, and a positive terminal insulation resistance $R_{ip}$, present between a positive terminal 22 of the energized electrical apparatus 2 and the aforesaid ground 3 ideally isolated from the energized electrical apparatus, is described below.

Such an electronic system 10 comprises an electronic device 1, at least one measurement circuit and electronic control processor C(s).

The electronic device 1 comprises a first device terminal 11 and a second device terminal 12, respectively connectable to the negative 21 and positive 22 terminals of the energized electrical apparatus 2.

The electronic device 1 further comprises a first switching circuit 16 and a second switching circuit 15.

The first switching circuit 16 is arranged between the positive terminal 12 and ground 3, and comprises a first switching unit, configured to take either one of two states according to a first driving signal having a positive branch switching duty-cycle $d_p$, and a first sample resistance $R_{kp}$ arranged in series with respect to the first switching unit.

The second switching circuit 15 is arranged between the negative terminal 11 and ground 3, and comprises a second switching unit configured to take either one of two states according to a second driving signal having a negative branch switching duty-cycle $d_n$ and a second sample resistance $R_{kn}$ arranged in series with respect to the second switching unit.

The measurement circuit, configured to measure a battery voltage $V_B$, present between the aforesaid negative terminal 11 and positive terminal 12, and a reference voltage $V_{iso}$, representative of a voltage present at the ends of one of the first switching circuit 16 and the second switching circuit 15.

Figure 3:
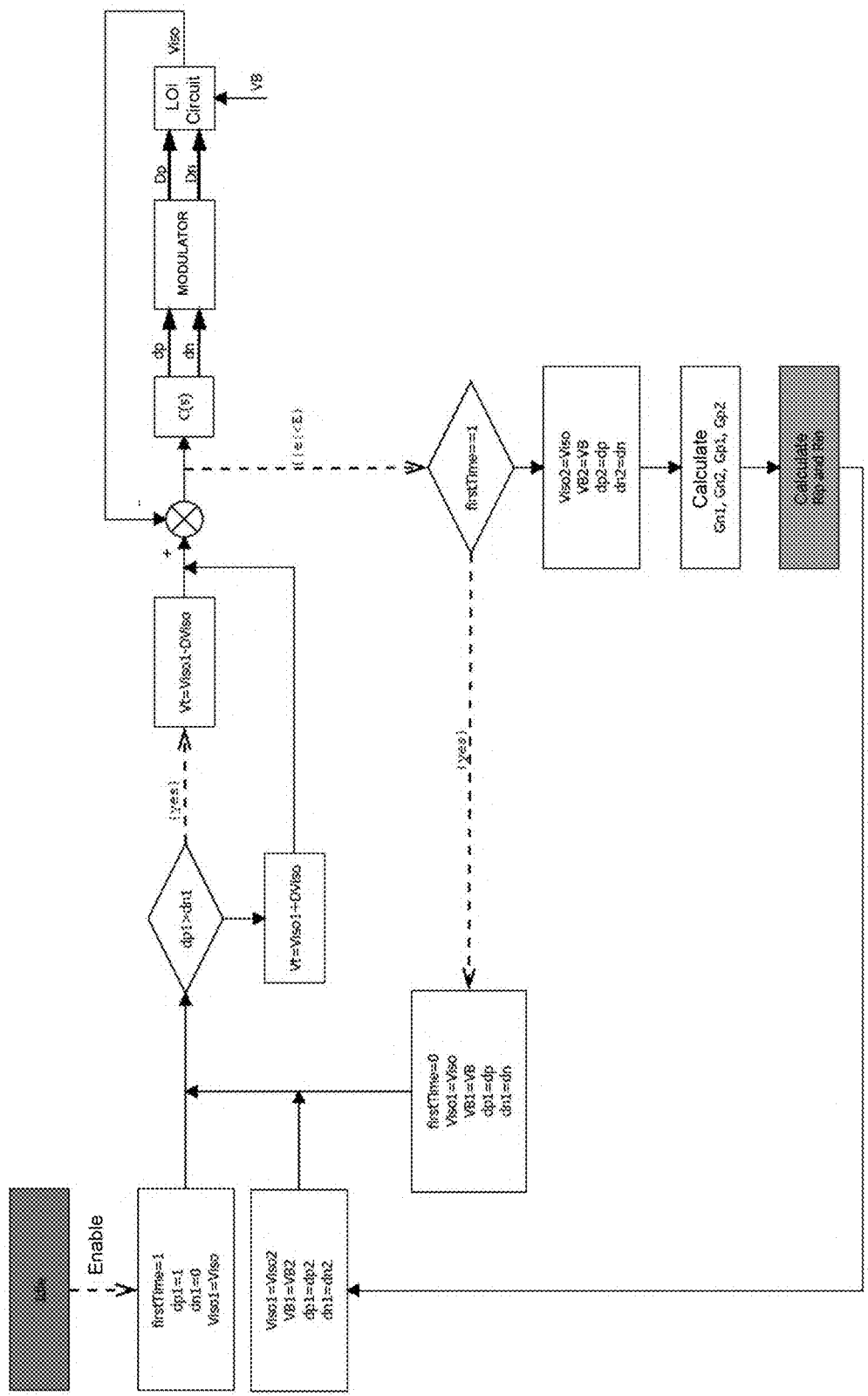
FIG. 3 shows a flow diagram of an insulation resistance calculation algorithm, comprised in an embodiment of the method according to the invention.
Figure 4:
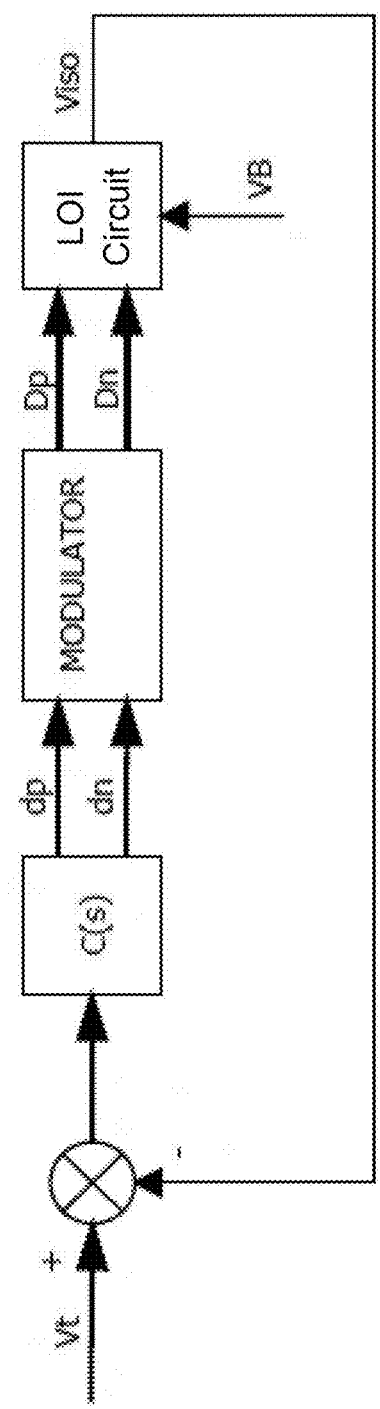
FIG. 4 diagrammatically shows, in a simplified manner, an insulation resistance measurement system, according to an embodiment of the invention.

The electronic control processor C(s), shown for example in FIGS. 3 and 4, is configured to carry out the following actions:

defining at least two working points of the circuit consisting of the energized electrical apparatus 2, the first switching circuit 16, and the second switching circuit 15; the first working point is associated with a first positive branch switching duty-cycle value $d_{p1}$ and a first negative branch switching duty-cycle value $d_{n1}$; the second working point is associated with a second positive branch switching duty-cycle value $d_{p2}$ and a second negative branch switching duty-cycle value $d_{n2}$;

controlling the first switching circuit 16 and the second switching circuit 15 so that they operate in accordance with the first working point, determining the first driving signal and the second driving signal based on the defined first working point, and providing the first driving signal to the first switching circuit 16 and the second driving signal to the second switching circuit 15;

then, controlling the first switching circuit 16 and the second switching circuit 15 so that they operate in accordance with the second working point, determining the first driving signal and the second driving signal based on the defined second working point, and providing the first driving signal to the first switching circuit 16 and the second driving signal to the second switching circuit 15;

receiving from the measurement circuit, in the condition in which the first switching circuit 16 and the second switching circuit 15 operate in accordance with the first working point, a respective first battery voltage value $V_{B1}$, measured between the aforesaid negative terminal 11 and positive terminal 12, and a respective first reference voltage value $V_{iso1}$, representative of a voltage present at the ends of one of the first switching circuit 16 and the second switching circuit 15;

receiving from the measurement circuit, in the condition in which the first switching circuit 16 and the second switching circuit 15 operate in accordance with the second working point, a respective second battery voltage value $V_{B2}$, measured between the aforesaid negative terminal 11 and positive terminal 12, and a respective second reference voltage value $V_{iso2}$ representative of a voltage present at the ends of one of the first switching circuit 16 and the second switching circuit 15;

calculating the aforesaid negative terminal insulation resistance $R_{in}$ and positive terminal insulation resistance $R_{ip}$, based on the aforesaid first battery voltage value $V_{B1}$, first reference voltage value $V_{iso1}$, second battery voltage value $V_{B2}$ and second reference voltage value $V_{iso2}$.

The electronic control processor C(s) is further configured to determine the aforesaid first positive branch switching duty-cycle value $d_{p1}$, first negative branch switching duty-cycle value $d_{n1}$, second positive branch switching duty-cycle value $d_{p2}$, and second negative branch switching duty-cycle value $d_{n2}$ based on the criterion of keeping the first reference voltage value $V_{iso1}$ and the second reference voltage value $V_{iso2}$ within a given neighborhood with respect to a predefined reference target voltage $V_r$.

According to an implementation option, the aforesaid measurement circuit of the system comprise the measurement circuit 17 (already mentioned several times previously) of the electronic device 1 and a battery voltage measurement circuit.

According to an embodiment, the electronic system 10 further comprises a modulator (shown for example in FIGS. 3 and 4), configured to receive from the electronic control processor digital logic driving signals and to generate and provide to the first switching circuit 16 and to the second switching circuit 15 respective physical driving signals, in accordance with a predefined modulation, characterized by the aforesaid positive branch switching duty-cycle $d_p$ and negative branch switching duty-cycle $d_n$, respectively.

According to an implementation option, the aforesaid physical driving signals are modulated with a modulation of the Pulse Width Modulation (PWM) type.

According to an implementation option (also shown in FIG. 1), the system comprises a further third switching circuit 18 comprising a third switching unit (comprising for example a third switch SWC), configured to take either one of two states according to a first driving signal having a positive branch switching duty-cycle $d_p$, and a first sample resistance $R_{SWC}$ arranged in series with respect to the aforesaid third switching unit. The third switching unit is arranged between the first device terminal 11 and the negative terminal 21 of the energized electrical apparatus.

In accordance with an embodiment, the electronic system 10 is implemented by an integrated circuit (as shown in FIG. 1B).

In accordance with several possible embodiments, the electronic system 10 is configured to perform an insulation resistance measuring method according to any one of the embodiments previously shown.

More precise details will be given below, regarding a further implementation example of the measurement method and system, together with an explanatory mathematical discussion aimed to highlight the relationships between the various quantities involved.

For descriptive summary purposes, the quantities involved will sometimes be indicated below using respective acronyms. In this respect, note that the detailed meaning of the acronyms and the quantities or entities to which they refer have already been shown in the previous part of the description, to which reference is therefore made for an even more exhaustive definition.

As noted above, the present method aims to measure an insulation loss (LOI—"Loss of Insulation"), i.e., to measure the insulation resistances $R_{ip}$, $R_{in}$ of the poles of a battery with respect to a ground, for example a reference voltage of the chassis of a vehicle in which the battery is mounted.

The circuit on which the analysis is carried out, in the example illustrated herein, is shown in FIG. 1, in which, in particular, two parts of an insulation resistance measurement device comprising two measurement branches, a positive branch and a negative branch, are indicated.

The positive branch (previously also defined as "first switching circuit 16") comprises a positive branch switch SWP switchable to open/close with a positive branch duty-cycle $d_p$ placed in parallel with a positive branch switch resistance $R_{swp}$.

The negative branch (previously also referred to as "second switching circuit 15") comprises a negative branch switch SWN switchable to open/close with a negative branch duty-cycle $d_n$ placed in parallel with a positive branch switch resistance $R_{swn}$.

Optionally, in this example the negative branch further comprises a measurement circuit 17, which in this implementation option is arranged in parallel with the second switching circuit 15 (considerations completely similar to those reported below also apply, mutatis mutandis, in the alternative implementation option in which the measurement circuit is arranged in parallel with the first switching circuit 16, as easily understood by any person skilled in the art).

As can be easily inferred from FIG. 1, when the switches SWP, SWN and SWI are in the open state, the circuit imposes a resistive path from each pole of the battery to the chassis of the vehicle: $R_{ip}$ for the positive pole, $R_{in}$ for the negative pole.

Assuming to close the switch SWI, when one of the two switches SWP or SWN is closed, the resistive path between the positive/negative pole and the chassis is heavily altered, by the switched resistances $R_{kp}$ and $R_{kn}$.

The scenarios described above lead to different voltages on the resistance $R_{iso}$. Such voltage values are read, for example by an analog-to-digital converter ADC, and the voltage values thus measured are used to solve a system of equations in the unknowns $R_{ip}$ and $R_{in}$ (as already described above, and as will be further shown below).

When one of the two switches SWP or SWN is closed, the reference voltage $V_{iso}$, acquired by the converter ADC, varies with a dynamic which depends on circuit parameters and an external load: $R_{ip}$, $R_{in}$, $C_{ip}$ and $C_{in}$.

For the negative branch, an equivalent resistance $R_{ns}$ is defined which depends on the duty-cycle of the switch SWN.

$$R_{ns} = \frac{R_{kn}(R_{kn} + R_{swn})}{R_{kn} + d_n R_{swn}} \rightarrow \begin{cases} R_{ns} = R_{kn}(\text{per } d_n = 1) \\ R_{ns} = R_{kn} + R_{swn}(\text{per } d_n = 0) \end{cases}$$

The parameter $d_n$ is the duty-cycle of the switch of SWN and $R_{swn}$ is the equivalent resistance of the negative switch.

The total conductance on the negative side is given by the parallel between $R_{ns}$ and $R_i+R_{iso}$.

$$G_n = \frac{1}{R_{ns}//(R_i+R_{iso})}$$

It is convenient to define a parameter P as:

$$P = \frac{R_{iso}}{R_i+R_{iso}}$$

For the positive branch, an equivalent resistance $R_{ps}$ is defined which depends on the duty-cycle of the switch SWP.

$$R_{ps} = \frac{R_{kp}(R_{kp}+R_{swp})}{R_{kp}+d_p R_{swp}} \rightarrow \begin{cases} R_{ps} = R_{kp}(d_p=1) \\ R_{ps} = R_{kp}+R_{swp}(d_p=0) \end{cases}$$

The parameter $d_p$ is the duty-cycle of the switch SWP and $R_{swp}$ is the equivalent resistance of the positive switch.

The total conductance on the positive side is given by the inverse of $R_{ps}$.

$$G_p = \frac{1}{R_{ps}}$$

Solving the circuit in FIG. 1, the voltage $V_{iso}$ is found by the following formula:

$$V_{iso} = \frac{V_B P(G_p+G_{ip})}{G_p+G_{ip}+G_n+G_{in}}$$

in which the unknowns of the equation are the conductances, respectively $G_{ip}$ and $G_{in}$, of the insulation resistances $R_{ip}$ and $R_{in}$.

Given the presence of two unknowns, two independent equations must be written.

As already described above, according to the present method this is obtained by articulating the previous equation into two different equations, each referring to a respective working point and a respective working condition of the circuit.

According to an implementation option, the first working point (working point 1) is defined by setting the pair of duty-cycle values $(d_{p1}, d_{n1})$ from which $G_{p1}$ and $G_{n1}$ can be calculated; the second working point (working point 2) is defined by setting the pair of duty-cycle values $(d_{p2}, d_{n2})$ from which $G_{p2}$ and $G_{n2}$ can be calculated.

To write two independent equations, the criterion is adopted according to which:

$$\begin{cases} d_{p1} \neq d_{p2} \\ d_{n1} \neq d_{n2} \end{cases}$$

As a result, the following system of equations is obtained:

$$\begin{cases} V_{iso1} = \dfrac{V_{B1}P(G_{p1}+G_{ip})}{G_{p1}+G_{ip}+G_{n1}+G_{in}} \\ V_{iso2} = \dfrac{V_{B2}P(G_{p2}+G_{ip})}{G_{p2}+G_{ip}+G_{n2}+G_{in}} \end{cases}$$

the solution of which in the unknowns $G_{ip}$ and $G_{in}$ is:

$$\begin{cases} G_{ip} = \dfrac{V_{iso1}V_{iso2}(G_{n1}+G_{p1}-G_{n2}-G_{p2})+P(V_{B2}V_{iso1}G_{p2}-V_{B1}V_{iso2}G_{p1})}{P(V_{B1}V_{iso2}-V_{B2}V_{iso1})} \\ G_{in} = \dfrac{V_{B1}P(G_{p1}+G_{ip})}{V_{iso1}} - (G_{ip}+G_{n1}+G_{p1}) \end{cases}$$

with the following constraints:

$$\begin{cases} V_{B1} > V_{BMin} \\ V_{B2} > V_{BMin} \\ V_{iso1} > V_{isoMin} \\ |V_{B1}V_{iso2}-V_{B2}V_{iso1}| > V_{isoMin}V_{BMin} \end{cases}$$

and in which the values $V_{BMin}$ and $V_{isoMin}$ are set so as to find meaningful solutions.

For example, the following values provide a situation which results in realistic and feasible solutions:

$$\begin{cases} V_{BMin} = 1 \text{ V} \\ V_{isoMin} = 1 \text{ mV} \end{cases}$$

Note that the insulation loss measurement time, in the known solutions, is typically very slow (for example, it can be up to 30 seconds) and depends on the DC bus capacity, hence one of the main drawbacks of such known solutions.

Advantageously, the solution suggested by the present method significantly reduces the measurement times, because it sets an insulation voltage value (or reference voltage) instead of waiting for the related stabilization time.

Moreover, advantageously, the method operates dynamically and iteratively, and the switches of both measurement branches are controlled with a respective duty-cycle, to modulate the resistances on the positive and negative branches, and reach a dynamic steady state of the insulation voltage (i.e., the reference voltage) $V_{iso}$.

Advantageously, the method includes using two different duty-cycles, which can be controlled and set independently of each other, thus providing two degrees of freedom to the control strategy, which allows to speed up response times and improve measurement accuracy.

Figure 2:
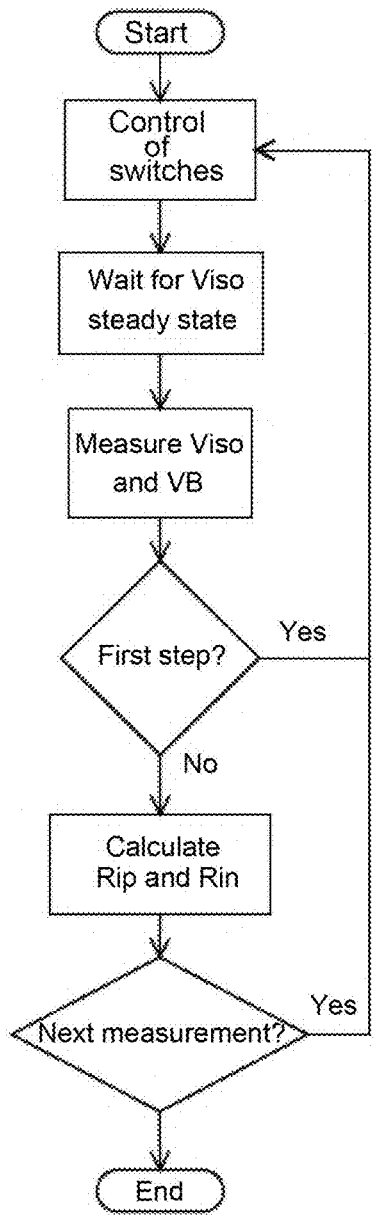
FIG. 2 shows a flow diagram of an insulation resistance calculation algorithm, comprised in an embodiment of the method according to the invention.

Providing the equations shown above, the insulation resistances, according to the embodiment considered herein, following the steps shown in FIG. 2.

To find the solution of the system of equations:

$$\begin{cases} V_{iso1} = \dfrac{V_{B1}P(G_{p1}+G_{ip})}{G_{p1}+G_{ip}+G_{n1}+G_{in}} \\ V_{iso2} = \dfrac{V_{B2}P(G_{p2}+G_{ip})}{G_{p2}+G_{ip}+G_{n2}+G_{in}} \end{cases}$$

it is appropriate (as already noted above) to identify two independent working points for the circuit (which are marked with the subscripts 1 and 2).

In this embodiment, the measurement is thus carried out in two steps, in accordance with what is shown in FIG. 3 and in table 1 below:

TABLE 1

| Phase | Switch | | | | Measurement |
|---|---|---|---|---|---|
| | SWP $d_p$ | SWN $d_n$ | SWC $d_c$ | SWI $d_i$ | |
| Step 1 | $d_{p1}$ | $d_{n1}$ | 1 | 1 | $V_{iso1}$, $V_{B1}$ |
| Step 2 | $d_{p2}$ | $d_{n2}$ | 1 | 1 | $V_{iso2}$, $V_{B2}$ |

An implementation option of this embodiment is shown in FIG. 3.

Starting from an "idle" state, if the measurement is started, the following variables are first initialized:

$$\begin{cases} firstTime = 1 \\ V_{iso1} = V_{iso} \\ d_{p1} = 1 \\ d_{n1} = 0 \end{cases}$$

in which:
the variable firstTime indicates whether the algorithm is started for the first time (for example, according to the convention used above, the value 1 indicates that we are in a phase in which the algorithm is started for the first time, while the value 0 indicates that we are in a phase in which the algorithm, already previously started, is being carried out);

$V_{iso1}$ is equal to the value of $V_{iso}$ sampled at startup;

the duty-cycle values $d_{p1}$ and $d_{n1}$ are set so as to start with the positive switch closed and the negative switch open, in this example (it will be appreciated how, similarly, it is possible to choose the opposite combination, without this affecting the result).

The next step is to evaluate the following condition and perform the following logic cycle: if $(d_{p1} > d_{n1})$ than $\{V_t = V_{iso1} - \Delta V_{iso}\}$ else $\{V_t = V_{iso1} + \Delta V_{iso}\}$.

The voltage $V_t$ is the reference target voltage for the insulation voltage $V_{iso}$.

According to the circuit in FIG. 1, when the positive branch duty-cycle is larger than the negative branch duty-cycle, the insulation voltage $V_{iso}$ increases, otherwise it decreases with respect to the previous state.

Thus, the target voltage $V_t$ is set so as to go in the opposite direction with respect to the previous state (as described in the "if else" construct above). With such logic and such a criterion, a divergent trend of the insulation voltage $V_{iso1}$ is avoided.

The voltage variation $\Delta V_{iso}$ with respect to the previous state is chosen and predefined based on time and accuracy requirements.

According to an implementation option which proved to be satisfactory, the voltage variation $\Delta V_{iso}$ is chosen of the order of magnitude of 100 mV, and, according to a typical particular example, is 100 mV.

The target voltage $V_t$ is sent in input to a controller or control processor or control device (comprised in the aforementioned "electronic control processor").

The method then includes comparing the error e detected by the controller with an error threshold E. If the absolute value of the error is less than the error threshold:

$|e| < E$ and the state of the variable firstTime is evaluated to be equal to 1 (since it is in the first start-up phase of the algorithm) the first working point is identified by sampling (i.e., measuring) the insulation voltage (i.e., the reference voltage) $V_{iso}$ and the battery voltage $V_B$.

Thus, the first working point is described by the following data:

$$\begin{cases} V_{iso1} = V_{iso} \\ V_{B1} = V_B \\ d_{p1} = d_p \\ d_{n1} = d_n \end{cases}$$

Now that the first working point has been found, the variable firstTime is set to 0.

The next steps are quite similar to those described above. The only difference is that, when the algorithm verifies that the variable firstTime this time (and subsequent times) is 0, the second working point is obtained by sampling (i.e., measuring) the insulation voltage (i.e., the reference voltage) $V_{iso}$ and the battery voltage $V_B$.

Thus, the second working point is described by the following data:

$$\begin{cases} V_{iso2} = V_{iso} \\ V_{B2} = V_B \\ d_{p2} = d_p \\ d_{n2} = d_n \end{cases}$$

After the identification of the two working points, the calculation of the circuit parameters ($G_{n1}$, $G_{n2}$, $G_{p1}$, $G_{p2}$) is carried out using the equations previously shown.

$$\begin{cases} R_{ns1} = \dfrac{R_{kn}(R_{kn} + R_{swn})}{R_{kn} + d_{n1}R_{swn}} = \rightarrow G_{n1} = \dfrac{1}{R_{ns1} // (R_i + R_{iso})} \\ R_{ns2} = \dfrac{R_{kn}(R_{kn} + R_{swn})}{R_{kn} + d_{n2}R_{swn}} = \rightarrow G_{n2} = \dfrac{1}{R_{ns2} // (R_i + R_{iso})} \end{cases}$$

$$\begin{cases} R_{ps1} = \dfrac{R_{kp}(R_{kp} + R_{swp})}{R_{kp} + d_{p1}R_{swp}} = \rightarrow G_{p1} = \dfrac{1}{R_{ps1}} \\ R_{ps2} = \dfrac{R_{kp}(R_{kp} + R_{swp})}{R_{kp} + d_{p2}R_{swp}} = \rightarrow G_{p2} = \dfrac{1}{R_{ps2}} \end{cases}$$

In the end, the insulation conductances are calculated (and therefore, obviously, the insulation resistances as the inverse of the conductances):

$$\begin{cases} G_{ip} = \dfrac{V_{iso1}V_{iso2}(G_{n1} + G_{p1} - G_{n2} - G_{p2}) + P(V_{B2}V_{iso1}G_{p2} - V_{B1}V_{iso2}G_{p1})}{P(V_{B1}V_{iso2} - V_{B2}V_{iso1})} \\ G_{in} = \dfrac{V_{B1}P(G_{p1} + G_{ip})}{V_{iso1}} - (G_{ip} + G_{n1} + G_{p1}) \end{cases}$$

Subsequently, in order to obtain a continuous measurement of the insulation resistances, we then proceed iteratively, replacing working point 1 with working point 2, to obtain a new working point 1 for the subsequent iteration cycle:

$$\begin{cases} V_{iso1} = V_{iso2} \\ V_{B1} = V_{B2} \\ d_{p1} = d_{p2} \\ d_{n1} = d_{n2} \end{cases}$$

According to an embodiment, the algorithm and method illustrated above are carried out by a closed loop system with negative feedback such as the one diagrammed in FIG. 4, consisting of:
- a controller (i.e., processor or control device, i.e., compensator) C(s);
- a modulation device (MODULATOR) configured to control the positive SWP and negative SWN switches of the first and second switching circuits;
- the complete circuit on which the controller and modulator operate (LOI Circuit) is for example the circuit shown in FIG. 1 (comprising the electronic device 1 and the battery 2); in particular, the voltage source $V_B$ can be diagrammed as an external disturbance.

According to several possible implementation options, the modulator can be designed according to various approaches.

According to a typical implementation option, the well-known Pulse Width Modulation (PWM) technique is used, in which the input signals $d_p$ and $d_n$ are the duty-cycles of square waves $D_p$ and $D_n$ with a fixed frequency (for example, typically 1 kHz).

According to an implementation option, a mixed modulation in frequency and pulse width is employed.

In accordance with an implementation option, the controller C(s) and the modulator are made using the following "if-else construct":

if $(V_t > V_{iso})$ than $\{D_p=1; D_n=0\}$ else $\{D_p=0; D_n=1\}$

In accordance with the LOI circuit shown in FIG. 1, in order to increase the voltage $V_{iso}$, the positive switch SWP is closed the negative switch SWN is opened, while, in order to decrease the voltage $V_{iso}$, the positive switch SWP is opened and the negative switch SWN is closed.

The controller aims to minimize the error between the target voltage $V_t$ and the reference voltage (or insulation voltage) $V_{iso}$.

For this purpose, $V_t$ is compared to $V_{iso}$ instant by instant (typically, with a time granularity of 1 ms).

If $V_t$ is greater than $V_{iso}$, the controller increases the voltage $V_{iso}$ by closing the positive switch and opening the negative switch.

If $V_t$ is less than $V_{iso}$, the controller lowers the voltage $V_{iso}$ by opening the positive switch and closing the negative switch.

In this embodiment, the duty-cycles $d_p$ and $d_n$ are calculated as the mean values of the signals (waves) $D_p$ and $D_n$ within a certain interval or time window. The time window within which the duty-cycles are calculated starts when the error between the target voltage $V_t$ and the insulation voltage $V_{iso}$ is less than the error threshold E.

For example, with a time window of 1 second and a calculation periodicity of 1 ms, the duty-cycle values $d_p$ and $d_n$ are calculated as:

$$d_p = \frac{1}{N}\sum_{k=0}^{N-1} D_p(k)$$

$$d_n = \frac{1}{N}\sum_{k=0}^{N-1} D_n(k)$$

in which N=1000 and $D_p(k)$ and $D_n(k)$ are the values of $D_p$ and $D_n$ set at each calculation task of 1 ms.

Figure 5:
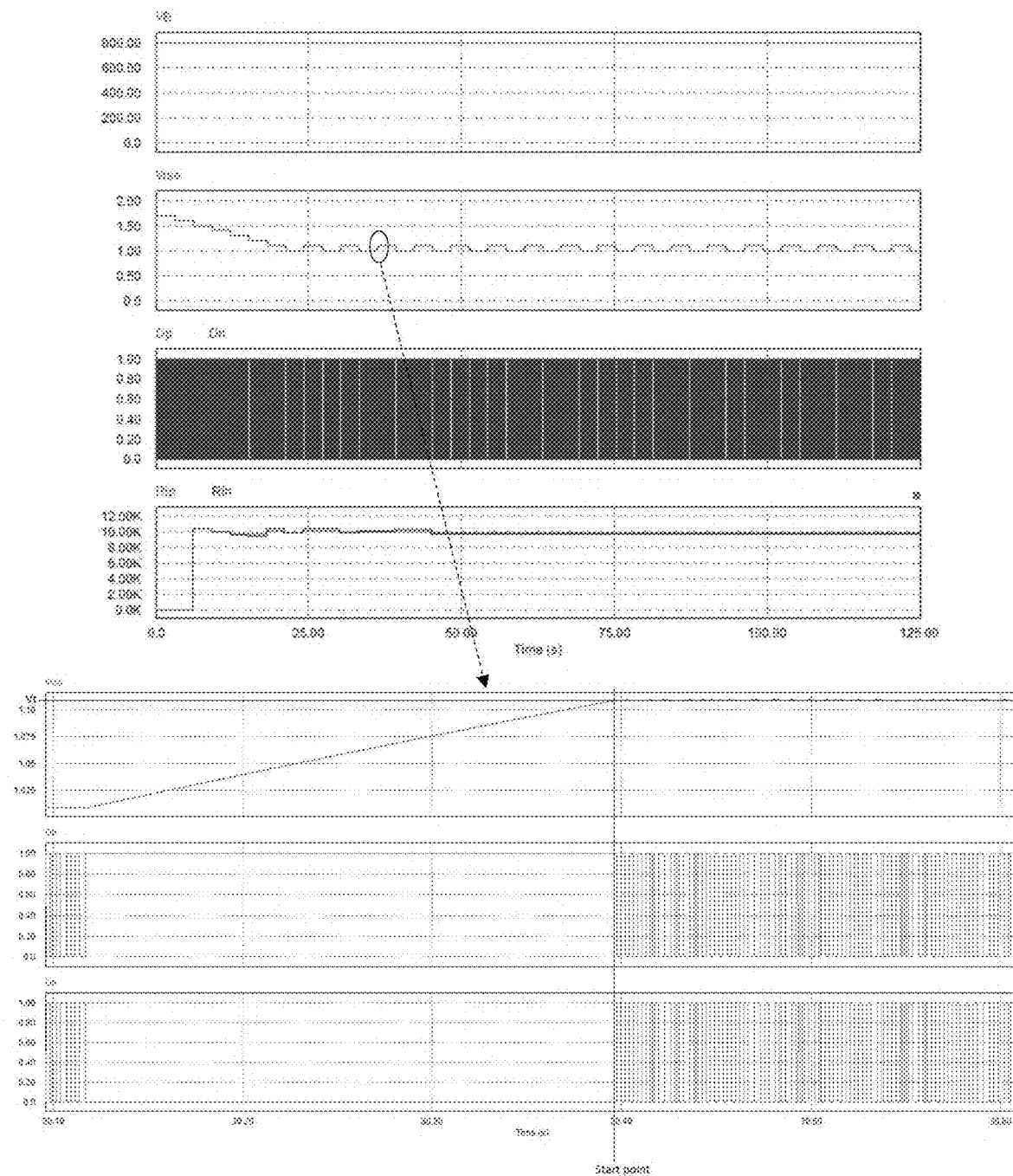
FIG. 5 shows some exemplary diagrams of the temporal trend of signals and variables involved in the method of the present invention.

FIG. 5 shows an example implementation in which the target voltage $V_t$ and the start instant of the time window within which the duty-cycles are calculated, and the length of the time windows are adjusted to obtain a desired accuracy.

The following table 2 shows results from simulations of the application of the present method.

TABLE 2

| Set values | | Estimated values | |
|---|---|---|---|
| $R_{ip}$ [k$\Omega$] | $R_{in}$ [k$\Omega$] | $R_{ip}$ [k$\Omega$] | $R_{in}$ [k$\Omega$] |
| 10000 | 10000 | 9720 | 9546 |
| 500 | 10000 | 502 | 9647 |
| 10000 | 500 | 9900 | 496 |
| 100 | 100 | 100 | 100 |

As already noted above, among the advantages of the present method, it is possible to mention low computation cost and speed, i.e., very short response times (typically <5 s).

As can be noted, the object of the present invention is fully achieved by the insulation measuring method and the related measurement device and measurement system, by virtue of the features thereof, which allow obtaining the advantages and solving the technical problems previously mentioned and discussed.

Those skilled in the art may make changes and adaptations to the embodiments of the insulation measuring method and the related measurement device and measurement system described above or can replace elements with others which are functionally equivalent in order to meet contingent needs without departing from the scope of the following claims.

Each of the features described above as belonging to one possible embodiment can be implemented irrespective of the other embodiments described. Moreover, note that the word "comprising" does not exclude other elements or steps and that the article "a" or "an" does not exclude a plurality. The figures are not in scale because they privilege the requirement of appropriately highlighting the various parts for greater clarity of disclosure.

The invention claimed is:

1. A method for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and said ground ideally isolated from the energized electrical apparatus, the method comprising the steps of:
   arranging a first switching circuit between said positive terminal and ground, thus in parallel with said positive terminal insulation resistance ($R_{ip}$), wherein the first switching circuit comprises a first switching unit, configured to take either one of two states according to a first driving signal having a positive branch switching duty-cycle ($d_p$), and a first sample resistance ($R_{kp}$) arranged in series with respect to said first switching unit;

arranging a second switching circuit between said negative terminal and ground, thus in parallel with said negative terminal insulation resistance ($R_{in}$), wherein the second switching circuit comprises a second switching unit configured to take either one of two states according to a second driving signal having a negative branch switching duty-cycle ($d_n$) and a second sample resistance ($R_{kn}$) arranged in series with respect to said second switching unit;

defining at least two working points of the circuit consisting of the energized electrical apparatus, the first switching circuit, and the second switching circuit, wherein the first working point is associated with a first positive branch switching duty-cycle value ($d_{p1}$) and a first negative branch switching duty-cycle value ($d_{n1}$), and the second working point is associated with a second positive branch switching duty-cycle value ($d_{p2}$) and a second negative branch switching duty-cycle value ($d_{n2}$);

controlling the first switching circuit and the second switching circuit so that they operate in accordance with said first working point, and measuring, in such a condition, a respective first battery voltage value ($V_{B1}$) present between said negative terminal and positive terminal and a respective first reference voltage value ($V_{iso1}$) representative of a voltage present at the ends of one of the first switching circuit and the second switching circuit, determined by the first working point and also dependent on both the negative terminal insulation resistance ($R_{in}$) and the positive terminal insulation resistance ($R_{ip}$);

controlling the first switching circuit and the second switching circuit so that they operate in accordance with said second working point, and measuring, in such a condition, a respective second battery voltage value ($V_{B2}$) present between said negative terminal and positive terminal and a respective second reference voltage value ($V_{iso2}$) representative of a voltage present at the ends of one of the first switching circuit and the second switching circuit, determined by the second working point and also dependent on both the negative terminal insulation resistance ($R_{in}$) and the positive terminal insulation resistance ($R_{ip}$);

calculating said negative terminal insulation resistance ($R_{in}$) and said positive terminal insulation resistance ($R_{ip}$), based on said first battery voltage value ($V_{B1}$), first reference voltage value ($V_{iso1}$), second battery voltage value ($V_{B2}$), and second reference voltage value ($V_{iso2}$);

wherein said step of defining at least two working points comprises determining said first positive branch switching duty-cycle value ($d_{p1}$), first negative branch switching duty-cycle value ($d_{n1}$), second positive branch switching duty-cycle value ($d_{p2}$), and second negative branch switching duty-cycle value ($d_{n2}$) based on the criterion of keeping the first reference voltage value ($V_{iso1}$) and the second reference voltage value ($V_{iso2}$) within a given neighborhood with respect to a predefined reference target voltage ($V_t$).

2. The method as set forth in claim 1, wherein said steps of defining at least two working points, controlling the first switching circuit and the second switching circuit so that they operate in accordance with the first working point, measuring a respective first battery voltage value ($V_{B1}$) and a respective first reference voltage value ($V_{iso1}$), controlling the first switching circuit and the second switching circuit so that they operate in accordance with the second working point, and measuring a respective second battery voltage value ($V_{B2}$) and a respective second reference voltage value ($V_{iso2}$), are carried out continuously and iteratively, so that the negative terminal insulation resistance ($R_{in}$) and the positive terminal insulation resistance ($R_{ip}$) are, in turn, continuously and dynamically calculated, wherein the negative terminal insulation resistance value ($R_{in}$) and the positive terminal insulation resistance value ($R_{ip}$) are considered valid if and/or since the first reference voltage value ($V_{iso1}$) and the second reference voltage value ($V_{iso2}$) differ from the predefined reference target voltage ($V_t$) by an error (e) less than a predefined maximum error (E).

3. The method as set forth in claim 1, wherein:
said first switching unit comprises a first switch (SWP), configured to take an open state or a closed state according to said first driving signal with positive branch switching duty-cycle ($d_p$), wherein the closed state has a substantially zero resistance and the open state has a resistance such as to be modeled as a first switching resistance ($R_{SWP}$) arranged in parallel with respect to said first switch (SWP);

said second switching unit comprises a second switch (SWN), configured to take an open state or a closed state according to said second driving signal with negative branch switching duty-cycle ($d_n$), wherein the closed has a substantially zero resistance and the open state has a resistance such as to be modeled as a second switching resistance ($R_{SWN}$) arranged in parallel with respect to said second switch (SWN).

4. The method as set forth in claim 3, wherein the negative terminal insulation resistance ($R_{in}$) is calculated as the inverse of a negative terminal insulation conductance ($G_{in}$) and the positive terminal insulation resistance ($R_{ip}$) is calculated as the inverse of a positive terminal insulation conductance ($G_{ip}$), wherein the negative terminal insulation conductance ($G_{in}$) and the positive terminal insulation conductance ($G_{ip}$) are calculated by solving a system of equations containing the following parameters, referred to measurable quantities or predefinable circuit parameters:

$V_{iso1}$ and $V_{iso2}$, i.e., the reference voltage values measured at the first and second working points, respectively, $V_{B1}$ and $V_{B2}$, i.e., the battery voltage values measured at the first and second working points, respectively, $G_{p1}$ and $G_{p2}$, i.e., the inverse values of an equivalent positive branch resistance ($R_{ps}$) calculated at the first and second working points, respectively, $G_{n1}$ and $G_{n2}$, i.e., the inverse values of an equivalent negative branch resistance ($R_{ns}$) calculated at the first and second working points, respectively, P, i.e., a parameter dependent on a reference voltage measurement circuit.

5. The method claim 1, wherein said steps of measuring a first reference voltage value ($V_{iso1}$) and a second reference voltage value ($V_{iso2}$) are carried out by a measurement circuit placed in parallel with the first switching circuit or the second switching circuit, said measurement circuit comprising a first measurement resistance ($R_i$) and a second measurement resistance ($R_{iso}$) arranged mutually in series to form a voltage divider, wherein said first reference voltage value ($V_{iso1}$) and second reference voltage value ($V_{iso2}$) correspond to the voltage present at the connection between the first measurement resistance ($R_i$) and the second measurement resistance ($R_{iso}$), measured at the first and second working points, respectively.

6. The method as set forth in claim 4, wherein:
said measurement circuit is arranged in parallel with the second switching circuit (16), i.e., with the negative switching branch;
said equivalent positive branch resistance ($R_{ps}$) and the values taken by the equivalent positive branch resistance ($R_{ps}$) for duty-cycle values equal to 1 and 0 are calculated by using an equation dependent on the first switching resistance ($R_{SWP}$), the first sample resistance ($R_{kp}$), and the positive branch switching duty-cycle ($d_p$);
said equivalent negative branch resistance ($R_{ns}$) and the values taken by the equivalent negative branch resistance ($R_{ns}$) for duty-cycle values equal to 1 and 0 are calculated by using an equation dependent on the second switching resistance ($R_{SWN}$), the second sample resistance ($R_{kn}$), and the negative branch switching duty-cycle ($d_n$);
said parameter P is representative of the voltage divider.

7. The method as set forth in claim 5, wherein said measurement circuit further comprises a measurement activation switch (SWI), arranged between said first measurement resistance ($R_i$) and second measurement resistance ($R_{iso}$), and configured to activate or deactivate the measurement operation based on a respective control signal (Di).

8. The method as set forth in claim 2, wherein said method steps, which are carried out continuously and iteratively, comprise the following steps:
defining a first initial working point, wherein one of said positive branch switching duty-cycle ($d_p$) and negative branch switching duty-cycle ($d_n$) is set to a value of 1, corresponding to the closure of the respective switch, and the other of said positive branch switching duty-cycle ($d_p$) and negative branch switching duty-cycle ($d_n$) is set to a value of 0, corresponding to the opening of the respective switch, and taking the measured initial reference voltage value ($V_{iso}$) as the first reference voltage value ($V_{t1}$, $V_{iso1}$);
defining the second working point through the following steps:
if the first positive branch switching duty-cycle value ($d_{p1}$) is higher than the first negative branch switching duty-cycle value ($d_{n1}$), defining as the second reference target voltage value ($V_t$) a value ($V_{iso1}-\Delta V_{iso}$) equal to the reference voltage measured at the previous working point ($V_{iso1}$) from which a predefined reference voltage variation value ($\Delta V_{iso}$) is subtracted;
if the first positive branch switching duty-cycle value ($d_{p1}$) is lower than the first negative branch switching duty-cycle value ($d_{n1}$), defining as the second reference target voltage value ($V_{t2}$) a value ($V_{t1}+\Delta V_{iso}$) equal to the reference voltage measured at the previous working point ($V_{iso1}$) to which a predefined reference voltage variation value ($\Delta V_{iso}$) is added;
determining the second positive branch switching duty-cycle value ($d_{p2}$) and the second negative branch switching duty-cycle value ($d_{n2}$), by varying the respective initial values, according to the criterion of causing the reference voltage ($V_t$) to tend towards said second reference target voltage value ($V_{t2}$).

9. The method as set forth in claim 8, wherein said steps of defining the first and second working points are carried out iteratively, according to a sequence of calculation sessions in which the previous second working point becomes the first working point, and a new second working point is defined in accordance with the step of defining a second working point,
so that a dynamically updated value of negative terminal insulation resistance ($R_{in}$) and positive terminal insulation resistance ($R_{ip}$) is determined at each calculation session.

10. The method as set forth in claim 1, wherein:
the first positive branch driving signal is a modulated signal of the Pulse Width Modulation (PWM) type with said first positive branch switching duty-cycle ($d_{p1}$, $d_{p2}$);
the second negative branch driving signal is a modulated signal of the Pulse Width Modulation (PWM) type with said second negative branch switching duty-cycle ($d_{n1}$, $d_{n2}$).

11. The method as set forth in claim 1, wherein said energized electrical apparatus is an electric vehicle battery, and wherein said ground ideally isolated from the energized electrical apparatus is a ground of the vehicle chassis or an isolated ground of an electrical control unit, ECU, of the vehicle.

12. A method for diagnosing an insulation loss of an energized electrical apparatus, including the steps of:
measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and said ground ideally isolated from the energized electrical apparatus;
diagnosing the insulation loss of the energized electrical apparatus (2) based on the measured negative terminal insulation resistance ($R_{in}$) and the measured positive terminal insulation resistance ($R_{ip}$),
wherein said measuring step is carried out by the method as set forth in claim 1.

13. An electronic device for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and said ground ideally isolated from the energized electrical apparatus, wherein the device comprises:
a first device terminal and a second device terminal being connectable to the negative and positive terminals of the energized electrical apparatus, respectively;
a first switching circuit arranged between said positive terminal and ground, thus in parallel with said positive terminal insulation resistance ($R_{ip}$), wherein the first switching circuit comprises a first switching unit, configured to take either one of two states according to a driving signal having a positive branch switching duty-cycle ($d_p$), and a first sample resistance ($R_{kp}$) arranged in series with respect to said first switching unit;
a second switching circuit arranged between said negative terminal and ground, thus in parallel with said negative terminal insulation resistance ($R_{in}$), wherein the second switching circuit comprises a second switching unit configured to take either one of two states according to a driving signal having a negative branch switching duty-cycle ($d_n$) and a second sample resistance ($R_{kn}$) arranged in series with respect to said second switching unit;

an electronic control processor configured to:
define at least two working points of the circuit consisting of the energized electrical apparatus, the first switching circuit, and the second switching circuit, wherein the first working point is associated with a first positive branch switching duty-cycle value ($d_{p1}$) and a first negative branch switching duty-cycle value ($d_{n1}$), and the second working point is associated with a second positive branch switching duty-cycle value ($d_{p2}$) and a second negative branch switching duty-cycle value ($d_{n2}$);
control the first switching circuit and the second switching circuit so that they operate in accordance with said first working point, and measure, in such a condition, a respective first battery voltage value ($V_{B1}$) present between said negative terminal and positive terminal and a respective first reference voltage value ($V_{iso1}$) representative of a voltage present at the ends of one of the first switching circuit and the second switching circuit, determined by the first working point and also dependent on both the negative terminal insulation resistance ($R_{in}$) and the positive terminal insulation resistance ($R_{ip}$);
control the first switching circuit and the second switching circuit so that they operate in accordance with said second working point, and measure, in such a condition, a respective second battery voltage value ($V_{B2}$) present between said negative terminal and positive terminal and a respective second reference voltage value ($V_{iso2}$) representative of a voltage present at the ends of one of the first switching circuit and the second switching circuit, determined by the second working point and also dependent on both the negative terminal insulation resistance ($R_{in}$) and the positive terminal insulation resistance ($R_{ip}$);
calculate said negative terminal insulation resistance ($R_{in}$) and said positive terminal insulation resistance ($R_{ip}$), based on said first battery voltage value ($V_{B1}$), first reference voltage value ($V_{iso1}$), second battery voltage value ($V_{B2}$), and second reference voltage value ($V_{iso2}$);
wherein the electronic control processor is configured to determine said first positive branch switching duty-cycle value ($d_{p1}$), first negative branch switching duty-cycle value ($d_{n1}$), second positive branch switching duty-cycle value ($d_{p2}$), and second negative branch switching duty-cycle value ($d_{n2}$) based on the criterion of keeping the first reference voltage value ($V_{iso1}$) and the second reference voltage value ($V_{iso2}$) within a given neighborhood with respect to a predefined reference target voltage ($V_t$).

14. The electronic device as set forth in claim 13, wherein:
said first switching unit comprises a first switch (SWP), configured to take an open state or a closed state according to said first driving signal with positive branch switching duty-cycle ($d_p$), wherein the closed state has a substantially zero resistance and the open state has a resistance such as to be modeled as a first switching resistance ($R_{SWP}$) arranged in parallel with respect to said first switch (SWP);
said second switching unit comprises a second switch (SWN), configured to take an open state or a closed state according to said second driving signal with negative branch switching duty-cycle ($d_n$), wherein the closed state has a substantially zero resistance and the open state has a resistance such as to be modeled as a second switching resistance ($R_{SWN}$) arranged in parallel with respect to said second switch (SWN).

15. The electronic device as set forth in claim 13, further comprising a measurement circuit placed in parallel with the first switching circuit or the second switching circuit, configured to perform said actions of measuring a first reference voltage value ($V_{iso1}$) and a second reference voltage value ($V_{iso2}$),
said measurement circuit comprising a first measurement resistance ($R_i$) and a second measurement resistance ($R_{iso}$) arranged mutually in series to form a voltage divider, wherein said first reference voltage value ($V_{iso1}$) and second reference voltage value ($V_{iso2}$) correspond to the voltage present at the connection between the first measurement resistance ($R_i$) and the second measurement resistance ($R_{iso}$), measured at the first and second working points, respectively.

16. The electronic device as set forth in claim 15, wherein said measurement circuit further comprises a measurement activation switch (SWI), arranged between said first measurement resistance ($R_i$) and second measurement resistance ($R_{iso}$), and configured to activate or deactivate the measurement operation based on a respective control signal (Di).

17. An electronic system for measuring a negative terminal insulation resistance ($R_{in}$), present between a negative terminal of an energized electrical apparatus and a ground ideally isolated from the energized electrical apparatus, and a positive terminal insulation resistance ($R_{ip}$), present between a positive terminal of the energized electrical apparatus and said ground ideally isolated from the energized electrical apparatus, wherein the system comprises:
an electronic device comprising a first device terminal and a second device terminal being connectable to the negative and positive terminals of the energized electrical apparatus, respectively, and further comprising: a first switching circuit, arranged between said positive terminal and ground, comprising a first switching unit, configured to take either one of two states according to a first driving signal having a positive branch switching duty-cycle ($d_p$), and a first sample resistance ($R_{kp}$) arranged in series with respect to said first switching unit; a second switching circuit arranged between said negative terminal and ground, and comprising a second switching unit configured to take either one of two states according to a second driving signal having a negative branch switching duty-cycle ($d_n$) and a second sample resistance ($R_{kn}$) arranged in series with respect to said second switching unit;
at least one measurement circuit, configured to measure a battery voltage ($V_B$) present between said negative terminal and positive terminal and a reference voltage ($V_{iso}$) representative of a voltage present at the ends of one of the first switching circuit and the second switching circuit;
an electronic control processor (C(s)) configured to:
define at least two working points of the circuit consisting of the energized electrical apparatus, the first switching circuit, and the second switching circuit, wherein the first working point is associated with a first positive branch switching duty-cycle value ($d_{p1}$) and a first negative branch switching duty-cycle value ($d_{n1}$), and the second working point is associated with a second positive branch switching duty-cycle value ($d_{p2}$) and a second negative branch switching duty-cycle value ($d_{n2}$);
control the first switching circuit and the second switching circuit so that they operate in accordance with said first working point, determining said first driving signal and said second driving signal based on the first working point defined, and providing the first switching circuit with said first driving signal and the second switching circuit with said second driving signal;

control the first switching circuit and the second switching circuit so that they operate in accordance with said second working point, determining said first driving signal and said second driving signal based on the defined second working point, and providing the first switching circuit with said first driving signal and the second switching circuit with said second driving signal;

receive from the at least one measurement circuit, in the condition in which the first switching circuit and the second switching circuit operate in accordance with the first working point, a respective first battery voltage value ($V_{B1}$) measured between said negative terminal and positive terminal and a respective first reference voltage value ($V_{iso1}$) representative of a voltage present at the ends of one of the first switching circuit and the second switching circuit;

receive from the at least one measurement circuit, in the condition in which the first switching circuit and the second switching circuit operate in accordance with the second working point, a respective second battery voltage value ($V_{B2}$) measured between said negative terminal and positive terminal and a respective second reference voltage value ($V_{iso2}$) representative of a voltage present at the ends of one of the first switching circuit and the second switching circuit;

calculate said negative terminal insulation resistance ($R_{in}$) and said positive terminal insulation resistance ($R_{ip}$), based on said first battery voltage value ($V_{B1}$), first reference voltage value ($V_{iso1}$), second battery voltage value ($V_{B2}$), and second reference voltage value ($V_{iso2}$);

wherein the electronic control processor is further configured to determine said first positive branch switching duty-cycle value ($d_{p1}$), first negative branch switching duty-cycle value ($d_{n1}$), second positive branch switching duty-cycle value ($d_{p2}$), and second negative branch switching duty-cycle value ($d_{n2}$) based on the criterion of keeping the first reference voltage value ($V_{iso1}$) and the second reference voltage value ($V_{iso2}$) within a given neighborhood with respect to a predefined reference target voltage ($V_t$).

18. The electronic system as set forth in claim 17, further comprising a modulator, configured to receive from the electronic control processor (C(s)) digital logic driving signals and to generate and provide to the first switching circuit and the second switching circuit respective physical driving signals, in accordance with a predefined modulation, using said positive branch switching duty-cycle ($d_p$) and negative branch switching duty-cycle ($d_n$), respectively.

19. The electronic system as set forth in claim 18, wherein said physical driving signals are modulated with a modulation of the Pulse Width Modulation (PWM) type.

* * * * *